May 27, 1924.
D. S. JACOBUS
Re. 15,848
STEAM BOILER ECONOMIZER AND METHOD OF OPERATING THE SAME
Original Filed Dec. 8, 1914 2 Sheets-Sheet 1
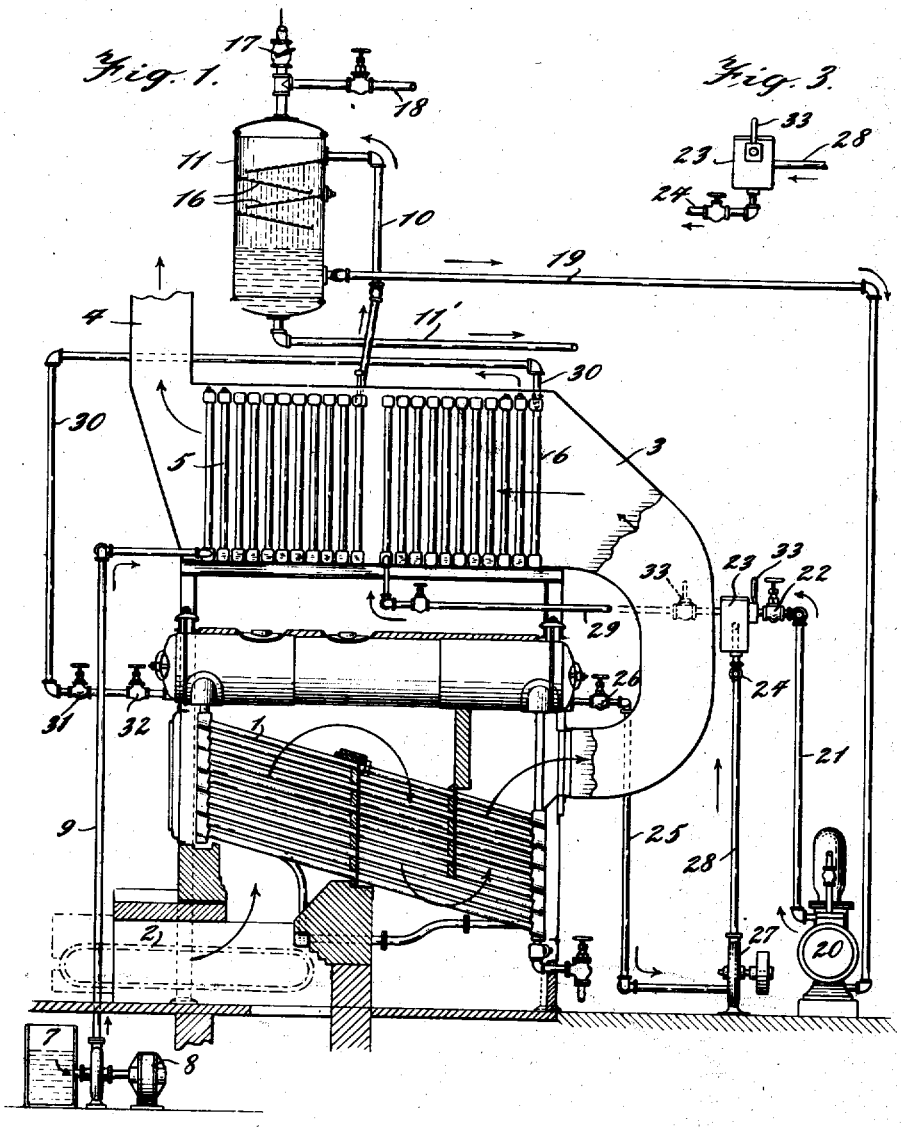
INVENTOR.
David S. Jacobus
BY
Siffar & Bull
ATTORNEYS May 27, 1924. Re. 15,848
D. S. JACOBUS
STEAM BOILER ECONOMIZER AND METHOD OF OPERATING THE SAME
Original Filed Dec. 8, 1914 2 Sheets-Sheet 2
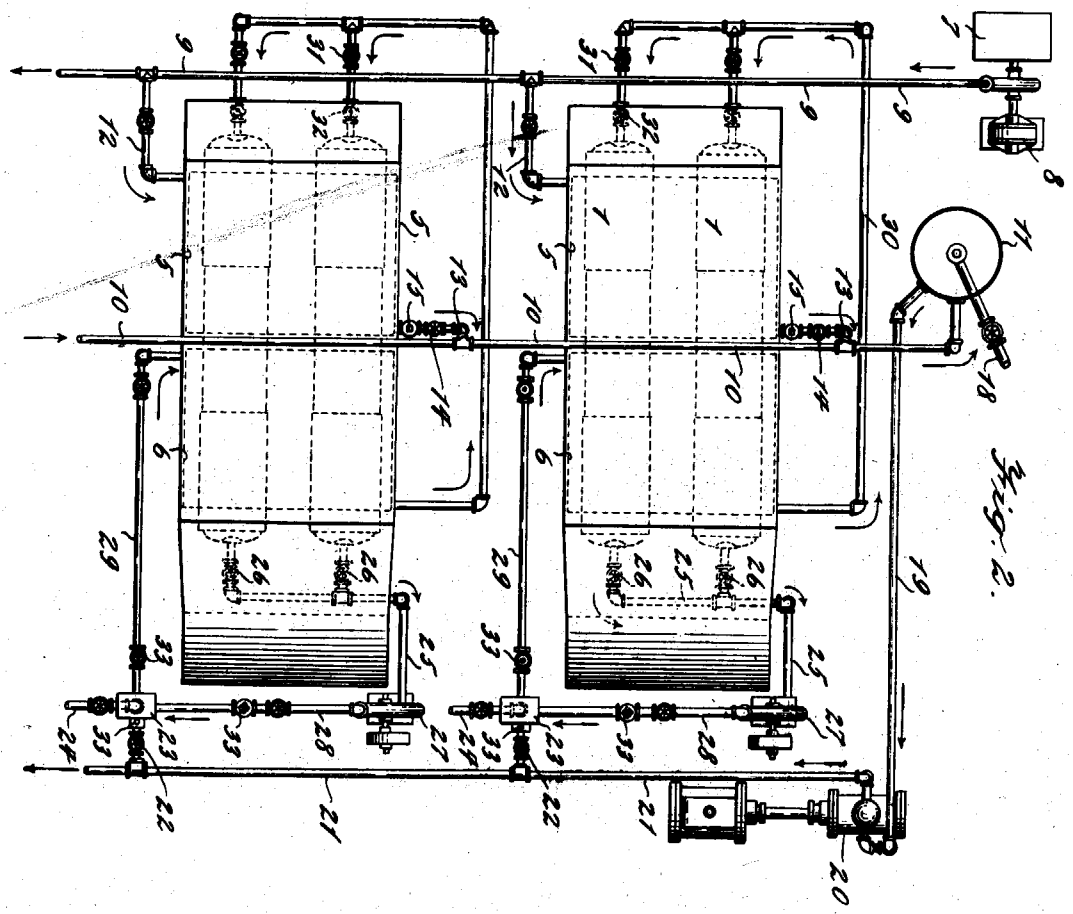
INVENTOR.
David S. Jacobus
BY
Gifford & Bull
ATTORNEYS Reissued May 27, 1924.

Re. 15,848

UNITED STATES PATENT OFFICE.

DAVID S. JACOBUS, OF JERSEY CITY, NEW JERSEY, ASSIGNOR TO THE BABCOCK & WILCOX COMPANY, OF BAYONNE, NEW JERSEY, A CORPORATION OF NEW JERSEY.

STEAM-BOILER ECONOMIZER AND METHOD OF OPERATING THE SAME.

Original application filed December 8, 1914, Serial No. 876,013, which was divided and application filed January 3, 1918, Serial No. 210,213, Patent No. 1,341,213, dated May 25, 1920. Application for reissue filed May 20, 1922. Serial No. 562,534. Patent No. 1,442,274 also surrendered.

*To all whom it may concern:*

Be it known that I, DAVID S. JACOBUS, a citizen of the United States, residing at Jersey City, in the county of Hudson and State of New Jersey, have invented certain new and useful Improvements in Steam-Boiler Economizers and Methods of Operating the Same, of which the following is a specification.

The present application is a division of my application Serial No. 876,013 filed December 8, 1914. As stated in that application, corrosion or pitting in the interior of a boiler is due to elements in the water that oxidize or otherwise affect the iron. This is often prevented or minimized by the addition to the water of a neutralizing reagent, such as carbonate of soda or lime, the reagent being added until the matter in solution in the water contained in the boiler accumulates to a point where the amount per gallon of water in the boiler, or the degree of concentration, is such as to effect the desired result. After the reagent is added it remains in the boiler as it is not evaporated in producing steam and the amount of the reagent that must be supplied after the first reagent is added will be only that required to make up for any chemical action, or for the amount that is lost in blowing down the boiler. The reagent may be added at intervals to the boiler, say once per day, or it may be added continuously to the feed water. If added continuously to the feed water the amount per gallon of feed water may be less than that needed to prevent the corrosion, and the reagent, or to be more exact, the resulting compound formed through the reagent acting on any impurities in the feed water and through the presence of an excess of the reagent over that required to act on the impurities, may be allowed to concentrate in the boiler to the proper point; for example, the feed water might be treated with two grains of the reagent per gallon which could be allowed to concentrate in the boiler to twenty grains per gallon of the reagent and the resulting compounds, and the twenty grains per gallon might give good results where the two grains per gallon would not.

An economizer cannot be protected from interior corrosion by the addition of a reagent from time to time as in a boiler as the reagent would pass directly through the economizer with the water; again, should the reagent be added continuously to the feed water, the elements in the feed water cannot be made to concentrate in the economizer in the way that they do in a boiler. In the numerical example just given, if twenty grains were needed to prevent corrosion, it would be necessary to treat the feed water with twenty grains per gallon to properly protect the economizer, which would make the treatment more costly than for a boiler and require the boiler to be blown down at frequent intervals to avoid over-concentration of the contained water.

Distilled water from a condenser, or such water with only a small amount of raw or make-up water mingled with it, has been found to give trouble through corrosion; air and carbonic acid gas in the feed water add to, or in some cases may be the sole cause of, corrosion.

The tendency in modern power plant practice is toward large size boiler units and high overloads, and to maintain a high capacity the boiler must be kept clean on its interior, otherwise there will be tube difficulties. It is, therefore, of extreme importance that the boiler feed water shall be of a high degree of purity and to meet the present tendency the practice is to cut down the amount of make-up water, to avoid the formation of scale in the tubes, and to increase the amount from the hot well, the latter being distilled water coming from the condensers in the plant. But feed water of the desired purity for the boiler may cause trouble through corrosion of the economizer, particularly if it is one of wrought iron or wrought steel.

The purpose of the present invention is to aid in preventing internal and external corrosion of a two-stage economizer which may be such as described in my Patent No. 1,219,320 granted March 13, 1917. In such two-stage economizers the water passing to the high pressure stage is heated solely by the waste gases. In my present invention I use some of the boiler water to aid in heating the water passing into the high pressure stage, and also introduce elements which aid in preventing corrosion of the tubes of the high pressure stage.

My invention will be understood by reference to the accompanying drawings, in which Figure 1 is a side elevation, partly in section, and more or less diagrammatic, of a plant comprising a two-stage economizer; Fig. 2 a diagrammatic plan view of two boiler units each having its individual mingling tank; and Fig. 3 a side view of the individual mixing tanks. Similar reference numerals indicate similar parts in the several views.

In Fig. 1 I have shown a boiler of a standard design in which the numeral 1 designates a bank of inclined generating tubes expanded into front and rear headers. The boiler may be fired by any well-known or usual means, a chain grate stoker 2 being indicated. The gases from the furnace flow through the boiler, as indicated by the arrows, to a flue 3 leading to the uptake 4. Located in the flue and, as shown, above the boiler, is an economizer comprising a low pressure stage or section 5 and a high pressure stage or section 6. These sections consist of tubes fitted into upper and lower boxes, the high pressure stage composed of wrought iron or wrought steel tubes and headers and subjected to the action of the hottest gases, and the low pressure section composed of cast iron tubes and headers and subjected to the action of the coldest gases.

7 indicates the source of the main supply of water, such as the hot well 7 to which the condensed steam from the plant is run, this being distilled water and practically free of chemical reagents. From the hot well the water is pumped by a pump 8 through pipe 9 to the low pressure section of the economizer and from said section the water is delivered through pipe 10 into the upper part of a tank 11. As shown in Fig. 2, the water is delivered to the low pressure sections 5 through valved branch connections 12 leading from the supply pipe 9, and from said sections the water is delivered to a common tank 11 through valved branch connections 13 leading to the pipe 10. Thermometers 14 are placed in the pipes 13, these thermometers being important in the operation of a plant as the valves 15 should be adjusted to give the desired outlet temperatures for the low pressure sections of the economizers.

The tank 11 to which the hot water is delivered from the low pressure sections of the economizers, is provided with a series of perforated shelves 16 over which the water is caused to flow. A relief valve 17 is placed at the top of the tank and the air and gases released from the heated water permitted to escape therethrough, or the air and gases may be withdrawn through a separate connection 18 to which an ejector or air pump may be connected to maintain the pressure below that of the atmosphere, if desired. The tank 11 is also provided with a blow-off connection 11′ for removing any mud or sediment which may collect from the feed water.

From the tank 11 the water is conducted by a pipe 19 to a feed pump 20 by which it is forced through a pipe 21 and valved branch connections 22 into tanks 23, there being one such tank for each boiler. The tanks 23 are preferably so arranged that any mud or sediment in the water will settle to the bottom and can be blown off through the valved connections 24. The purpose of the tanks 23 is to mingle the feed water therein with water from the corresponding boiler, which boiler water contains a certain amount of a chemical reagent which, when the water is passed through the high pressure stages of the economizers, will assist in preventing or minimizing corrosion of the tubes. As shown, the boiler water is taken from the steam and water drums of each boiler through a pipe 25, having valved branch connections 26, to pump 27 and delivered to the corresponding mingling tank 23 through pipe 28. The pumps 27 require a comparatively small amount of power as they overcome only the difference in pressure between the boiler and that which the entering feed water from the pipe 21 produces in the tank 23, which must be sufficiently higher than that in the boiler to overcome the resistance of the high pressure stage of the economizer and its connections. The mingled volume of water from each tank 23 passes through its outlet pipe 29 to the high pressure section 6 of the corresponding economizer, and from the latter through pipe 30 and branch connections having feed valves 31 and ordinary check valves 32, into the steam and water drum. Thermometers 33 are placed in the valved connections 22 and in the pipes 28 and 29 to indicate the temperatures of the feed water and boiler water entering the tanks 23, and of the mingled volume leaving said tanks. By noting the difference in temperature between the incoming and outgoing water the amount returned from the boiler to the feed water may be determined.

The pipes 9, 10 and 21 are shown as open-ended to indicate that they may be used for more than the two boilers shown.

The water from the hot well 7 may be at the temperature of approximately 80° F., and this water is heated when it passes through the several low pressure economizer sections. When mingled with the boiler water, the temperature of the water in each of the tanks 23 is above a temperature which will prevent sweating on the outside of the wrought iron or wrought steel tubes of the high pressure sections 6 of the economizer, say for example 120° F., and this prevents or minimizes corrosion on the exterior of said tubes, As the pressure in sections 5 of the economizers is comparatively low, said sections may be made of cast iron tubes which experience has shown will withstand interior corrosion to a greater extent than wrought iron or wrought steel, or this section may be made up of tubes of some other metal and, by using tubes of the right diameter and properly spacing them, the heat transferred from the gases to the tubes may be made a maximum with a minimum draft loss.

By maintaining a proper concentration of the reagent in the boiler, the water in the several tanks 23 may be made to contain a sufficient amount of the reagent to prevent interior corrosion of the tubes of the high pressure section without raising the temperature of the water in said tanks above a point which will interfere with the economy of the plant. The amount of the chemical reagent in solution in the boiler may be graduated by adding more or less of such reagent, either intermittently or continuously, to the respective tanks 23, or by introducing it at the hot well. The only addition of a reagent is that necessary to make up for a leakage, for any water that may be blown away from the boilers, and for any chemical reaction which may take place within the economizers and boilers. The degree of concentration of the water in the boiler may be determined by the standard method of chemical titration, or by measuring the density of the water.

The invention is not, however, limited to the use of boiler water to which a chemical reagent has been added. In its broader aspect it includes the return of a certain amount of water from the boiler to the economizer. Where the water used for making up for leakage and for blowing down the boilers, or what is known as the make-up water, contains in itself the necessary elements to prevent corrosion, no reagent need be added. Whether the make-up water is one which requires the addition of reagents or a water which carries the necessary elements to prevent corrosion, the present invention, prevents or lessens the tendency to corrosion in the economizer. The following example will serve to make my meaning clear. Assume that there is 10 per cent of make-up water containing 8 grains of material per gallon of a nature that will tend to stop the corrosion that occurs with distilled water from the condensers. The mixture of the make-up water with the distilled water from the condensers would contain 0.73 grains per gallon. If operated in the ordinary way the water passing through the economizer would contain 0.73 grains per gallon of the material that would tend to stop corrosion, whereas the water contained in the boiler might be concentrated so as to contain say 100 grains of the same material per gallon. If now the boiler and economizer are operated in accordance with the present invention, and one pound of water containing 100 grains per gallon is withdrawn from the boiler and mingled with 5 pounds of the water containing 0.73 grains per gallon, the material in the mingled water which would pass through the economizer would amount to about 17 grains per gallon, a larger amount than the original, 0.73 grains, leading to a lesser amount of interior corrosion. By practising the invention, therefore, the grains of matter tending to reduce corrosion in the numerical case considered is increased more than twenty times over what would exist in ordinary practice.

In operating two or more boilers in which the water after passing through the low pressure sections of the economizers is mingled in a common tank with water drawn from all the boilers, care must be exercised to maintain the amount of concentration in the boilers at about the same point. Should a materially less amount of water, in proportion to the water evaporated, be returned from one of the boilers to the common mixing tank, the water in the boiler from which the less amount is drawn would soon reach a higher degree of concentration than the other boilers. According to the present invention, however, the necessity of making a close adjustment of the water allowed to flow from each boiler is eliminated for the reason that all of the water taken from a particular boiler, and mingled with the feed water, is returned to the same boiler from which it is withdrawn. Where a chemical reagent is necessary it is preferably introduced along with the make-up water and in that case the amount of concentration in each of the boilers may be regulated by blowing off more or less water from the boiler. Should a boiler be accidentally blown down to an amount which causes the concentration of the contained water to be too low, the required amount of reagent, in solution, may be pumped directly into the boiler.

From the foregoing description it will be seen that I prevent or minimize corrosion of the high pressure sections of the economizers by eliminating the air and gases from the water, and by adding a certain amount of water from the boiler containing elements which resist corrosion.

As before stated, the drawings are diagrammatic. Certain common and well-known features such as safety valves for the economizers have not been shown. Regulating the supply of make-up water and maintaining the proper level of water in the hot well, as well as regulating the water level in the tank 11, may be carried out in many well-known ways. These are operating features aside from the principles of my invention which I have described.

What I claim and desire to secure by Letters Patent of the United States is: —

1. The method of operating a plurality of boilers consisting in first dividing the main supply of water and passing the separated portions thereof through corresponding economizer sections, collecting the several portions of the water so heated and distributing it and mingling the several portions with water from the boilers containing corrosion preventing elements, and then forcing the mingled volumes through other corresponding sections of the economizers at a higher pressure than the first sections, and thence into the corresponding boiler, whereby the water drawn from a given boiler is returned to that boiler and corrosion of the economizer minimized through the action of the corrosion preventing elements and the heat of the boiler water.

2. The method of operating a plurality of boilers consisting in first passing the main supply of water through corresponding economizer sections, delivering the water so heated to a common tank and permitting the air and gases to escape therefrom, distributing the water from said tank to individual tanks and mingling the water in the latter with water containing corrosion preventing elements from the corresponding boiler, and then forcing the mingled volumes through corresponding sections of the economizer at a higher pressure than the first sections, thence into the boilers, whereby the water drawn from a given boiler is returned to that boiler, and corrosion of the economizer minimized through the action of the corrosion preventing elements and the heat of the boiler water.

3. In combination, a plurality of steam boilers, each having a sectional economizer adapted to be heated by the waste gases, means for delivering the main supply of water to corresponding low pressure economizer sections and from the latter to a common tank, individual tanks for the respective boilers, connections from said common tank to said individual tanks and from the boilers to the respective individual tanks, and means for forcing the mingled volumes from the individual tanks through the high pressure sections of the economizers subjected to the hottest gases and thence into the corresponding boiler.

4. In combination, a plurality of steam boilers each having a sectional economizer adapted to be heated by the waste gases, means for conducting the feed water at a low pressure through corresponding economizer sections, means intermediate the economizer sections to which the heated water is conducted, an individual mingling tank for each boiler, connections from said common tank and from the boilers to said last-named tanks, and means for forcing the mingled volumes from the individual tanks through corresponding sections of the economizers at a higher pressure than the first sections and thence into the boilers.

5. In combination, a plurality of steam boilers, each having a sectional economizer adapted to be heated by the waste gases, means for delivering the main supply of water to corresponding low pressure economizer sections and from the latter to a common tank, individual tanks for the respective boilers, connections from said common tank to said individual tanks and from the boilers to the respective individual tanks, and means for forcing the mingled volumes from the individual tanks through the high pressure sections of the economizers subjected to the hottest gases and thence into the corresponding boiler, and thermometers in the connections leading to and from said individual tanks.

6. In combination, a plurality of steam boilers, each having a sectional economizer adapted to be heated by the waste gases, means for delivering the main supply of water to corresponding low pressure economizer sections and from the latter to a common tank, individual tanks for the respective boilers, connections from said common tank to said individual tanks and from the boilers to the respective individual tanks, means for forcing the mingled volumes from the individual tanks through the high pressure sections of the economizers subjected to the hottest gases and thence into the corresponding boiler, and connections for removing any mud or sediment which may collect in the individual tanks.

7. The method of operating a boiler and an economizer, whereby the water in the boiler may, by the presence of a water-treatment chemical in the feed water, be maintained charged with a desired quantity of such chemical in excess of the amount required for the chemical action in the boiler, and the water passing through the economizer may be charged with a percentage of the chemical greatly in excess of the percentage in the feed water, which consists in providing a feed water charged with a quantity of the chemical sufficient to give the desired percentage in the boiler, drawing water from the boiler and mingling it at boiler pressure with the feed water in an amount sufficient to give the mingled water a percentage of the chemical greatly in excess of the percentage in the feed water alone, feeding the mingled water to the economizer and delivering the water from the economizer to the boiler.

8. The method of operating a boiler, consisting of withdrawing water containing corrosion-preventing elements from the boiler, mingling it with the feed water for the boiler, feeding the mingled volume to an economizer, delivering the water from the economizer to the boiler, maintaining the water drawn from the boiler under boiler pressure from the time it is withdrawn until it is fed to the economizer, and regulating the amount of water taken from the boiler in accordance with the feed entering the same.

9. The method of operating a plurality of boilers, each connected to a separate economizer, whereby the water in each boiler may, by the presence of a water-treatment chemical in the common feed water supply for all the boilers, be maintained charged with a desired quantity of such chemical in excess of the amount required for the chemical action in the boiler, and the water passing through each economizer may be charged with a percentage of the chemical greatly in excess of the percentage in the feed water, which consists in providing a common source of supply of feed water at boiler pressure, drawing water from each boiler and mingling it at boiler pressure with the feed water for that boiler in an amount sufficient to give the mingled water a percentage of the chemical contained in the boiler water greatly in excess of the percentage in the feed water alone, feeding the mingled water for each boiler to a corresponding economizer and delivering the water from each economizer to its boiler, whereby the water drawn from a given boiler is returned to that boiler.

10. The method of operating a boiler and an economizer, whereby the water in the boiler may, by the presence of a water treatment chemical in the feed water, be maintained charged with a desired quantity of such chemical in excess of the amount required for the chemical action in the boiler, and the water passing through the economizer may be charged with a percentage of the chemical greatly in excess of the percentage in the feed water, which consists in providing a feed water charged with a quantity of the chemical sufficient to give the desired percentage in the boiler, drawing water from the boiler and mingling it at boiler pressure with the feed water in an amount sufficient to give the mingled water a percentage of the chemical greatly in excess of the percentage in the feed water alone, and a temperature high enough to prevent external sweating in the economizer, feeding the mingled water to the economizer and delivering the water from the economizer to the boiler.

11. The method of operating a plurality of boilers, each connected to a separate economizer, consisting of withdrawing water containing corrosion-preventing elements from each boiler, mingling it with feed water from a source common to all the boilers, feeding the mingled volume for each boiler to a corresponding economizer, delivering the water drawn from the economizer to its boiler, maintaining the water drawn from each boiler under boiler pressure from the time it is withdrawn until it is fed to the economizer, and regulating the amount of water taken from each boiler in accordance with the water fed to that boiler.

12. In combination a plurality of steam boilers each having an economizer arranged to be heated by the waste gases, a mingling tank for each boiler adapted to maintain the boiler pressure therein, means for maintaining, at boiler pressure, a common feed water supply for all of the boilers, means for delivering the main supply of water and also water from each boiler under boiler pressure to the corresponding tank, a connection from each tank to the corresponding economizer and a connection from the latter to its boiler and means whereby the amount of water taken from each boiler may be regulated in accordance with the water fed to that boiler.

13. In combination, a steam boiler having an economizer arranged to be heated by the waste gases, a mingling tank for the boiler adapted to maintain boiler pressure therein, means for delivering the main supply of water and also water from the boiler under boiler pressure to the tank, a connection from the tank to the economizer and a connection from the latter to the boiler and means whereby the amount of water taken from the boiler may be regulated in accordance with the water fed to the boiler.

DAVID S. JACOBUS.